United States Patent Office 3,816,499
Patented June 11, 1974

3,816,499
MANUFACTURE OF ISOCYANATES
Geoffrey Ernest Beswick and Robert Joseph Lindsay, Blackley, Manchester, England, assignors to Imperial Chemical Industries Limited, London, England
No Drawing. Filed Sept. 11, 1972, Ser. No. 287,698
Claims priority, application Great Britain, Sept. 22, 1971, 44,201/71
Int. Cl. C07c 119/04
U.S. Cl. 260—453 P          8 Claims

ABSTRACT OF THE DISCLOSURE

A process for the manufacture of α-isocyanatoalkyl benzenoid compounds containing one or more α-isocyanatoalkyl groups which comprises reacting an α-haloalkyl benzenoid compound with a cyanate of an alkali metal, an ammonium radical or an alkaline earth metal in a ketonic or aldehyde solvent of the formula $R^1COR^2$ where $R^1$ represents methyl or hydrogen and $R^2$ represents an aryl radical or an alkyl radical containing up to 3 carbon atoms in the presence of phosphorus pentoxide and a weakly basic organic tertiary nitrogen compound.

---

This invention relates to the manufacture of certain organic isocyanates by the reaction of organic halides with inorganic cyanates.

It is known that isocyanates can be obtained by reaction of organic halides containing aliphatically bound halogen atoms with alkali metal, ammonium or alkaline earth metal cyanates at elevated temperatures in the presence of solvents.

The present invention is directed to a process for the manufacture of α-isocyanatoalkyl benzenoid compounds containing one or more α-isocyanatoalkyl groups which comprises reacting an α-haloalkyl benzenoid compound with a cyanate of an alkali metal, an ammonium radical or an alkaline earth metal in a ketonic or aldehyde solvent of the formula $R^1COR^2$ where $R^1$ represents methyl or hydrogen and $R^2$ represents an aryl radical or an alkyl radical containing up to 3 carbon atoms, in the presence of phosphorus pentoxide and a weakly basic organic tertiary nitrogen compound.

α-Haloalkyl benzoid compounds which may be used in the present process include those of the formula:

$$ARYL[C(R^3)_2Halogen]_n$$

wherein $n$ is an integer of from 1 to 4 and each $R^3$ represents independently hydrogen or an alkyl group having from 1 to 4 carbon atoms and ARYL represents a benzene nucleus optionally substituted with halogen, alkyl groups of from 1 to 20 carbon atoms or alkoxy groups of from 1 to 4 carbon atoms.

Thus examples of α-haloalkyl benzenoid compounds which may be used in the present process include 2,5-dimethyl p-xylylene dichloride,
2,5-dimethyl p-xylylene dibromide,
2,3,5,6-tetramethyl p-xylylene dichloride,
p-xylylene dichloride,
benzyl chloride,
benzyl bromide,
1,4-bis(α-chloroethyl)-benzene,
1,3-bis-(α-chloroethyl)-benzene,
m-xylylene dichloride,
m-xylylene dibromide,
4-methyl-m-xylylene dichloride,
4-ethyl-m-xylylene dichloride,
4,5-dimethyl-m-xylylene dichloride,
4,6-dimethyl-m-xylylene dichloride,
2,4,5-trimethyl-m-xylylene dichloride,
2,4,6-trimethyl-m-xylylene dichloride,
2,4,5,6-tetramethyl-m-xylylene dichloride,
4-butyl benzylchloride; 4-dodecylbenzylchloride,
2-methyl-4-ethylbenzylbromide,
4-methyl-6-ethyl-m-xylylenedichloride,
2-methyl-5-ethyl-m-xylylenedichloride,
1,3,5-tris-(chloromethyl)-2,4,6-trimethylbenzene,
2,4,6-tris-(chloromethyl)-m-xylene,
4-methoxybenzylchloride,
4-methoxy-m-xylylenedichloride
1,3,5-tris-(chloromethyl)-2-methoxy-4,6-dimethylbenzene,
2,4-bis-(chloromethyl)-1-methoxy-3,5-dimethylbenzene,
3-chlorobenzyl chloride,
4-chlorobenzylchloride,
3,4-dichlorobenzylchloride,
5-chloro-m-xylylene dichloride,
2-methyl-5-chloro-m-xylylene dichloride.

Preferred α-haloalkylbenzenoid compounds for use in the present invention are those wherein the benzenoid compound in substituted in at least one position *ortho* to each —$C(R^3)_2$Halogen group by an alkyl group for example methyl or ethyl and wherein $R^3$ is hydrogen and the halogen is chlorine. Such starting materials are easily obtained by chloromethylation of the corresponding alkyl benzenes.

The invention is particularly useful when $n$ is 2 or 3.

Alkali metal, alkaline earth metal or ammonium cyanates which may be used in the present process include the cyanates of lithium, sodium, potassium, magnesium, calcium, strontium, barium, and the ammonium ion. They also include the cyanates of substituted ammonium ions such as methyl ammonium, dimethyl ammonium, trimethylammonium and triethylammonium cyanates. The cyanate is preferably employed in a finely divided form.

Solvents of the formula $R^1COR^2$ as hereinbefore defined include acetone, methyl ethyl ketone, methyl isopropylketone, benzaldehyde, acetophenone and methyl *n*-propyl ketone.

It is an essential feature of the invention that phosphorus pentoxide be included in the reaction mixture and although it is preferred to use from 0.06 mol to 0.36 mol of phosphorus pentoxide per mol of halogen compound amounts outside these proportions may be used.

As examples of weakly basic tertiary nitrogen compounds which may be used there may be mentioned tetramethyl urea, N,N-diethylaniline, N,N-dimethylaniline and quinoline.

The amount of weakly basic tertiary nitrogen compound used is preferably such that for every one gram mole of phosphorus pentoxide present there is used an amount of the nitrogen compound equivalent to one gram atom of nitrogen.

The reaction is conveniently carried out at atmospheric pressure at elevated temperatures of from 20° C. to 250° C. although temperatures outside this range can be used. A preferred reaction temperature is from 50° to 160° C., that most conveniently employed being that of the boiling solvent. The period of heating required is to a large extent dependent on the particular compounds and the temperature being used.

It is preferred to carry out the reaction in the presence of a known catalyst.

Catalysts for the reaction include copper and its salts, quaternary ammonium salts, particularly the bromide and iodides, the iodides of alkali metals and alkaline earth metals, iodine, bromine, and iodine chlorides, for example the monochloride or trichloride. Mixtures of catalysts may be used.

A particularly preferred catalyst is potassium iodide.

As with all reactions involving isocyanates the present process is carried out under substantially anhydrous conditions with exclusion of water or water vapour. An inert gas atmosphere can be used if desired.

It is preferred that the alkali metal, alkaline earth metal or ammonium cyanate used in the present process be first rendered into a fine state of sub-division by milling in solvent in the presence of a finely divided inert substrate.

As solvent for use in this milling stage there may be used any of the solvents normally used in the process, examples are listed hereinbefore.

As finely divided inert substrate there may be used any such material which is inert in the fact that it is unreactive towards the reactants and the isocyanate group. Finely divided inert materials of the type commonly used as catalyst supports are particularly suitable. Examples of such materials include activated carbons, kieselguhr and related siliceous earths including filter aids such as Hyflo Supercel, pumice, porcelain, silica, asbestos, alumina, quartz, kaolin and magnesia.

Activated carbons and siliceous earths are the preferred substrates.

The milling of the inorganic cyanate in the presence of the inert substrate may be carried out by any of the standard milling techniques, for example ball milling, gravel milling or high speed shear milling.

The amount of inert substrate may vary considerably, levels of about 5% to 20% by weight of the inorganic cyanate have been found to be sufficient.

After the milling stage the cyanate, solvent and inert substrate mixture is added to the rest of the reactants and the reaction carried out in the normal manner.

If desired, catalyst may be mixed with the cyanate before milling.

The process of the present invention can be used to prepare a wide range of isocyanates and polyisocyanates.

Examples of isocyanates which can be made by the present process include amongst others:

4-methyl-*m*-xylylene diisocyanate,
4,6-dimethyl-*m*-xylylene diisocyanate,
2,4,6-trimethyl-*m*-xylylene diisocyanate,
2,4,6-tris(isocyanatomethyl)-*m*-xylene,
2,4,6-tris(isocyanatomethyl)-1,3,5-trimethylbenzene,
4-chloro-*o*-xylylene diisocyanate,
4,5-dichloro-*o*-xylylene diisocyanate,
3,4,5,6-tetramethyl-*o*-xylylene diisocyanate,
*o*-xylylene diisocyanate,
5-methyl-*m*-xylylene diisocyanate,
2,5-dimethyl-*m*-xylylene diisocyanate,
4-ethyl-*m*-xylylene diisocyanate,
4-isopropyl-*m*-xylylene diisocyanate,
2-methyl-5-ethyl-*m*-xylylene diisocyanate,
2-methyl-5-isopropyl-*m*-xylylene diisocyanate,
5-chloro-*m*-xylylene diisocyanate,
2-methyl-5-chloro-*m*-xylylene diisocyanate,
4-methoxy-*m*-xylylene diisocyanate,
2-methoxy-5-methyl-*m*-xylylene diisocyanate,
2,5-dimethyl-*p*-xylylene diisocyanate,
2,3,5,6-tetramethyl-*p*-xylylene diisocyanate,
*p*-xylylene diisocyanate,
benzyl isocyanate,
*m*-xylylene diisocyanate,
1,4-bis-(α-isocyanatoethyl)-benzene,
4,5-dimethyl-*m*-xylylene diisocyanate,
2,4,5-trimethyl-*m*-xylylene diisocyanate,
2,4,5,6-tetramethyl-*m*-xylylene diisocyanate,
4-methylbenzyl isocyanate,
4-butyl benzyl isocyanate,
4-dodecyl benzyl isocyanate,
2-methyl-4-ethyl benzyl isocyanate,
4-methyl-6-ethyl-*m*-xylylene diisocyanate,
2,4,6-tris(isocyanatomethyl)-*m*-xylene,
4-methoxy benzyl isocyanate,
1,3,5-tris(isocyanatomethyl)-2-methoxy-4,6-dimethyl benzene,
2,4-bis-(isocyanatomethyl)-1-methoxy-3,5-dimethyl benzene,
3-chlorobenzyl isocyanate,
4-chlorobenzyl isocyanate,
3,4-dichlorobenzyl isocyanate.

Isocyanates prepared by the present process may be used for the preparation of monomeric, oligomeric or polymeric ureas or urethanes by known methods. Those containing two or more isocyanate groups are particularly useful for the preparation of polyurethanes including surface coatings, adhesives, solid urethane rubbers, fibres and foams.

The invention is illustrated but not limited by the following examples in which all parts and percentages are by weight except where otherwise stated.

EXAMPLE 1

A mixture of 10 parts of potassium cyanate, 0.5 parts of potassium iodide, 1 part of Hyflo Supercel and 80 parts of dry acetone was milled with a Silverson mixer for 10 minutes. The suspension was stirred at 57° C. with 11.6 parts of 1,4-bis-chloromethyldurene, 0.5 parts of tetramethyl urea, 1.5 parts of phosphorus pentoxide and a further 40 parts of dry acetone for 11 hours after which time complete conversion to 1,4-bis(isocyanatomethyl) durene was shown by a gas-liquid chromatogram of a sample of the mixture.

The mixture was filtered into 75 parts of 100/120 petrol ether and the residues were washed with 40 parts of dry acetone. 120 parts of acetone were distilled from the solution which was then cooled to −25° C. The solution was filtered and the product washed with 100/120 petrol ether and air oven dried. There was obtained 11.0 parts of 1,4-bis(isocyanatomethyl)durene of strength 91.0% by isocyanate titration to M.W. 244, corresponding to a yield of 82.0% of theory.

EXAMPLE 2

A preparation was carried out as in Example 1 but using phosphorus pentoxide (0.5 parts) and tetramethyl urea (0.5 parts), the reaction time being 9 hours. The preparation gave 9.1 parts of 1,4-bis(isocyanatomethyl)-durene of strength 86.0%, corresponding to a yield of 64.1% of theory.

EXAMPLE 3

A similar preparation was carried out using phosphorus pentoxide (2.5 parts) and tetramethyl urea (0.5 parts). The method employed was as in Example 1 the reaction being complete in 13 hours. The isocyanate was isolated as in Example 1 giving 8.7 parts of 1,4-bis(isocyanatomethyl)durene of strength 89.3%, corresponding to a yield of 63.7% of theory.

EXAMPLE 4

A similar preparation was carried out using 1.5 parts of phosphorus pentoxide but using 1.28 parts of N,N-diethylaniline in place of tetramethylurea. The method used was as in Example 1 the reaction being complete in 9 hours. The isocyanate was isolated as in Example 1 giving 11.7 parts of 1,4-bis(isocyanatomethyl)durene of strength 91.7%, corresponding to a yield of 87.9% of theory.

We claim:
1. A process for the manufacture of α-isocyanatoalkyl benzenoid compounds containing one or more α-isocyanatoalkyl groups which comprises reacting at a temperature of from 20° to 250° C. and α-haloalkyl benzenoid compound of the formula

$$ARYL[C(R^3)_2 Halogen]_n$$

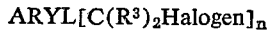

wherein $n$ is an integer of from 1 to 4 and each $R^3$ represents independently hydrogen or an alkyl group having from 1 to 4 carbon atoms, and ARYL represents a benzene nucleus or a benzene nucleus substituted with one or more methyl groups, with a cyanate of an alkali metal, an ammonium radical or an alkaline earth metal in a ketonic or aldehyde solvent of the formula $R^1COR^2$ where $R^1$ represents methyl or hydrogen and $R^2$ represents a phenyl radical or an alkyl radical containing up to 3 carbon atoms in the presence of phosphorus pentoxide in an amount of 0.06 mol to 0.36 mol per mole of halogen compound, and a weakly basic organic tertiary nitrogen compound selected from the group consisting of tetramethyl urea, N,N-dimethylaniline, N,N-diethylaniline and quinoline present in an amount such that for every 1 gram mole of phosphorus pentoxide present an amount of nitrogen compound is used equivalent to 1 gram atom of nitrogen.

2. A process as claimed in claim 1 wherein the α-haloalkyl benzenoid compound is substituted in at least one position ortho to each —$C(R^3)_2$Halogen group by a methyl group and wherein $R^3$ is hydrogen and the Halogen is chloride.

3. A process as claimed in claim 1 wherein $n$ is 2 or 3.

4. A process a claimed in claim 1 wherein the reaction is carried out at a temperature of from 50° to 160° C.

5. A process as claimed in claim 1 wherein the reaction is carried out in the presence of a known catalyst for the reaction.

6. A process as claimed in claim 5 wherein the catalyst is potassium iodide.

7. A process as claimed in claim 1 wherein the alkaline metal, alkaline earth metal or ammonium cyanate is first rendered into a fine state of sub-division by milling in solvent in the presence of a finely divided inert substrate.

8. A process as claimed in claim 4 wherein the substrate is an activated carbon or a siliceous earth.

References Cited
UNITED STATES PATENTS

| | | | |
|---|---|---|---|
| 2,866,803 | 12/1958 | De Pree | 260—453 |
| 3,440,270 | 4/1969 | McMaster et al. | 260—453 |
| 3,558,684 | 1/1971 | Von Brachel et al. | 260—453 |

LEWIS GOTTS, Primary Examiner

D. H. TORRENCE, Assistant Examiner